(12) United States Patent
Tang

(10) Patent No.: US 11,212,050 B2
(45) Date of Patent: Dec. 28, 2021

(54) METHOD AND DEVICE FOR DETERMINING RESOURCE OF LOGICAL CHANNEL, AND COMPUTER STORAGE MEDIUM

(71) Applicant: SHENZHEN HEYTAP TECHNOLOGY CORP., LTD., Guangdong (CN)

(72) Inventor: Hai Tang, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/646,089

(22) PCT Filed: Sep. 12, 2017

(86) PCT No.: PCT/CN2017/101453
§ 371 (c)(1),
(2) Date: Mar. 10, 2020

(87) PCT Pub. No.: WO2019/051654
PCT Pub. Date: Mar. 21, 2019

(65) Prior Publication Data
US 2020/0287674 A1  Sep. 10, 2020

(51) Int. Cl.
*H04W 4/00* (2018.01)
*H04L 5/00* (2006.01)
(Continued)

(52) U.S. Cl.
CPC .......... *H04L 5/0044* (2013.01); *H04W 72/04* (2013.01); *H04W 72/12* (2013.01)

(58) Field of Classification Search
CPC ... H04L 5/0044; H04L 5/0053; H04L 1/1812; H04W 72/04; H04W 72/12; H04W 72/042; H04W 76/27; H04W 72/0446
See application file for complete search history.

(56) References Cited

U.S. PATENT DOCUMENTS

2003/0140168 A1* 7/2003 Peshkin ................ H04L 29/06
709/245
2017/0048903 A1* 2/2017 Yi .......................... H04W 4/70
(Continued)

FOREIGN PATENT DOCUMENTS

CN    101646250 B    8/2012
CN    102711269 A    10/2012
(Continued)

OTHER PUBLICATIONS

3GPP TSG RAN WG2 Meeting #99 R2-1708682 Berlin, Germany, Aug. 21-25, 2017 (Year: 2017).*
(Continued)

*Primary Examiner* — Atique Ahmed
(74) *Attorney, Agent, or Firm* — Perkins Coie LLP

(57) ABSTRACT

Disclosed in the present invention are a method and device for determining a resource of a logical channel, and a computer storage medium. The method comprises: a terminal receives configuration information sent by a network side, the configuration information being provided with a first mapping relationship between association information of a data packet and at least one of the following resource attributes: a TTI and a carrier, the terminal determines a second mapping relationship between the logical channel and the association information of the data packet and determines, on the basis of the first mapping relationship and the second mapping relationship, at least one of the following resource attributes corresponding to the logical channel: the TTI and the carrier.

12 Claims, 7 Drawing Sheets

(51) Int. Cl.
*H04W 72/04* (2009.01)
*H04W 72/12* (2009.01)

(56) References Cited

U.S. PATENT DOCUMENTS

| | | | | |
|---|---|---|---|---|
| 2017/0201461 | A1* | 7/2017 | Cheng | .................... H04L 43/16 |
| 2018/0255559 | A1* | 9/2018 | Lee | ................... H04W 72/1278 |
| 2019/0075548 | A1* | 3/2019 | Lee | ...................... H04W 72/044 |
| 2019/0116475 | A1* | 4/2019 | Lee | ....................... H04W 72/02 |

FOREIGN PATENT DOCUMENTS

| | | |
|---|---|---|
| CN | 103095408 B | 1/2016 |
| CN | 106900005 A | 6/2017 |
| WO | 2017123500 A1 | 7/2017 |

OTHER PUBLICATIONS

3GPP TSG-RAN WG2 Meeting #99, R2-1708511, Berlin, Germany, Aug. 21-25, 2017 (Year: 2017).*
First Office Action of the European application No. 17925222.6, dated Jan. 13, 2021.
Qualcomm Incorporated. "R2-1708682:Carrier Aggregation for V2X Phase 2" 3GPP TSG RAN WG2 Meeting #99, Aug. 25, 2017 (Aug. 25, 2017), main body, section 2.
Qualcomm Incorporated et al. "R2-154799: Priority Handing for Sidelink Direct Communication" 3GPP TSG-RAN WG2 Meeting #91 Bis, Oct. 9, 2015( Oct. 9, 2015), main body, section 2.
International Search Report in the international application No. PCT/CN2017/101453, dated May 30, 2018.
ZTE, "Consideration on short TTI based PC5 operation", 3GPP TSG-RAN WG2 Meeting #99 R2-1708511,Aug. 25, 2017.
First Office Action of the Chinese application No. 201780048089.0, dated Feb. 20, 2020.
Guangdong Oppo Mobile Telecom: "Mode 4 support in eV2X carrier aggregation", 3GPP Draft; R1-1713251 3rd Generation Partnership Project (3GPP), Mobile Competence Centre; 650, Route Des Lucioles; F-06921 Sophia-Antipolis Cedex ; France,vol. RAN WG1, No. Prague, P.R. Czechia; Aug. 21, 2017-Aug. 25, 2017 Aug. 20, 2017 (Aug. 20, 2017), XP051316058, p. 2.
"3rd Generation Partnership Project; Technical Specification Group Services and System Aspects; Architecture enhancements for V2X services (Release 14)", 3GPP Standard; Technical Specification; 3GPP TS 23.285, 3rd Generation Partnership Project (3GPP), Mobile Competence Centre; 650, Route Des Lucioles; F-06921 Sophia-Antipolis Cedex ; France, vol. SA WG2, No. V14.3.0, Jun. 12, 2017 (Jun. 12, 2017), p. 1.35, XP051298387, [retrieved on Jun. 12, 2017].
"3rd Generation Partnership Project; Technical Specification Group Core Network and Terminals; User Equipment (UE) to V2X control function; protocol aspects; Stage 3 (Release 14)", 3GPP Standard; Technical Specification; 3GPP TS 24.386, 3rd Generation Partnership Project (3GPP), Mobile Competence Centre; 650, Route Des Lucioles ; F-06921 Sophia-Antipolis Cedex ; France, vol • CT WG1, No. V14.1.0, Jun. 15, 2017 (Jun. 15, 2017), pp. 1-33, XP051298528, [retrieved on Jun. 15, 2017].
Supplementary European Search Report in the European application No. 17925222.6, dated May 8, 2020.
English Translation of the Written Opinion of the International Search Authority in the international application No. PCT/CN2017/101453, dated May 30, 2018.

* cited by examiner

METHOD AND DEVICE FOR DETERMINING RESOURCE OF LOGICAL CHANNEL, AND COMPUTER STORAGE MEDIUM

CROSS-REFERENCE TO RELATED APPLICATIONS

The present application is a U.S. National Phase Entry of International PCT Application No. PCT/CN2017/101453 filed on Sep. 12, 2017, and named after "METHOD AND DEVICE FOR DETERMINING RESOURCE OF LOGICAL CHANNEL, AND COMPUTER STORAGE MEDIUM", the content of which is hereby incorporated by reference in its entirety.

TECHNICAL FIELD

The disclosure relates to Vehicle-to-Everything (V2X) in the field of mobile communications, and particularly to a method and device for determining a resource for a logical channel, and a computer storage medium.

BACKGROUND

A Long-Term Evolution (LTE) Device-to-Device (D2D) based a Sidelink (SL) transmission technology is used in a V2X system. Different from a way of receiving or sending communication data through a base station in a traditional LTE system. A terminal-to-terminal direct communication mode is employed in the V2X system, thus having a higher spectral efficiency and a lower transmission delay.

In the 3rd Generation Partnership Project (3GPP) Rel-14, the Vehicle-to-Everything (V2X) is standardized, and two transmission modes are defined: mode 3 and mode 4. In mode 3, a transmission resource of a terminal is allocated by a base station. In mode 4, a terminal determines a transmission resource in a sensing and reservation combined mode.

For the above mode 4, in Rel-14, a selection of a resource is based on a scenario of one carrier, i.e., a single-carrier scenario. In Rel-15, evolved V2x (eV2x) is extended to a multi-carrier scenario, that is, a terminal can transmit and receive data on more than one carriers simultaneously. In this way, how to select a carrier and a Transmission Time Interval (TTI) for data of a logical channel is an urgent problem to be solved.

SUMMARY

In order to solve the above technical problem, a method and device for determining a resource for a logical channel, and a computer storage medium are provided in embodiments of the disclosure.

In embodiments of the disclosure, provided is a method for determining a resource for a logical channel, including: receiving, by a terminal, configuration information from a network side, wherein the configuration information is configured with a first mapping relationship between information associated with a data packet and at least one of the following resource attributes: a TTI, or a carrier; determining, by the terminal, a second mapping relationship between the logical channel and the information associated with the data packet; and determining, by the terminal, at least one of the following resource attributes corresponding to the logical channel based on the first mapping relationship and the second mapping relationship: the TTI, or the carrier.

In embodiments of the disclosure, the information associated with the data packet includes one of the following: a ProSe Per packet priority (PPPP) corresponding to the data packet, a destination address corresponding to the data packet, or a Provider Service ID (PSID) corresponding to the data packet.

In embodiments of the disclosure, the first mapping relationship configured in the configuration information includes one of the following: a mapping relationship of the PPPP corresponding to the data packet with the TTI; a mapping relationship of the destination address corresponding to the data packet with the TTI; or a mapping relationship of the PSID corresponding to the data packet with the TTI.

In embodiments of the disclosure, the second mapping relationship includes one of the following: a mapping relationship of the logical channel with the PPPP corresponding to the data packet; a mapping relationship of the logical channel with the destination address corresponding to the data packet; or a mapping relationship of the logical channel with the PSID corresponding to the data packet.

In embodiments of the disclosure, the following resource attribute corresponding to the logical channel is determined based on the first mapping relationship and the second mapping relationship: the TTI.

In embodiments of the disclosure, the first mapping relationship configured in the configuration information includes one of the following: a mapping relationship of the PPPP corresponding to the data packet with the carrier; a mapping relationship of the destination address corresponding to the data packet with the carrier; or a mapping relationship of the PSID corresponding to the data packet with the carrier.

In embodiments of the disclosure, the following resource attribute corresponding to the logical channel is determined based on the first mapping relationship and the second mapping relationship: the carrier.

In embodiments of the disclosure, the first mapping relationship configured in the configuration information includes one of the following: a mapping relationship of the PPPP corresponding to the data packet with the TTI and the carrier; a mapping relationship of the destination address corresponding to the data packet with the TTI and the carrier; or a mapping relationship of the PSID corresponding to the data packet with TTI and the carrier.

In embodiments of the disclosure, the following resource attributes corresponding to the logical channel is determined based on the first mapping relationship and the second mapping relationship: the TTI and the carrier.

In embodiments of the disclosure, a mapping relationship between the logical channel and the resource attribute is a third mapping relationship, and the method further includes: acquiring, by the terminal, a transmission resource; and determining, by the terminal, at least one of the following resource attributes corresponding to the transmission resource: the TTI, or the carrier; and determining, by the terminal, one or more logical channels associated with the transmission resource based on the resource attribute corresponding to the transmission resource, and the third mapping relationship.

In embodiments of the disclosure, provided is a device for determining a resource for a logical channel, including: a receiving unit, configured to receive configuration information from a network side, wherein the configuration information is configured with a first mapping relationship between information associated with a data packet and at least one of the following resource attributes: a TTI, or a carrier; a first determination unit, configured to determine a second mapping relationship between the logical channel and the information associated with the data packet; and a second determination unit, configured to determine at least one of the following resource attributes corresponding to the logical channel based on the first mapping relationship and the second mapping relationship: the TTI, or the carrier.

In embodiments of the disclosure, the information associated with the data packet includes: a PPPP corresponding to the data packet, a destination address corresponding to the data packet, or a PSID corresponding to the data packet.

In embodiments of the disclosure, the first mapping relationship configured in the configuration information includes one of the following: a mapping relationship of the PPPP corresponding to the data packet with the TTI; a mapping relationship of the destination address corresponding to the data packet with the TTI; or a mapping relationship of the PSID corresponding to the data packet with the TTI.

In embodiments of the disclosure, the second mapping relationship includes one of the following: a mapping relationship of the logical channel with the PPPP corresponding to the data packet; a mapping relationship of the logical channel with the destination address corresponding to the data packet; or a mapping relationship of the logical channel with the PSID corresponding to the data packet.

In embodiments of the disclosure, the second determination unit is configured to determine the following resource attribute corresponding to the logical channel based on the first mapping relationship and the second mapping relationship: the TTI.

In embodiments of the disclosure, the first mapping relationship configured in the configuration information includes one of the following: a mapping relationship of the PPPP corresponding to the data packet with the carrier; a mapping relationship of the destination address corresponding to the data packet with the carrier; or a mapping relationship of the PSID corresponding to the data packet with the carrier.

In embodiments of the disclosure, the second determination unit is configured to determine the following resource attribute corresponding to the logical channel based on the first mapping relationship and the second mapping relationship: the carrier.

In embodiments of the disclosure, the first mapping relationship configured in the configuration information includes one of the following: a mapping relationship of the PPPP corresponding to the data packet with the TTI and the carrier; a mapping relationship of the destination address corresponding to the data packet with the TTI and the carrier; or a mapping relationship of the PSID corresponding to the data packet with the TTI and the carrier.

In embodiments of the disclosure, the second determination unit is configured to determine the following resource attributes corresponding to the logical channel based on the first mapping relationship and the second mapping relationship: the TTI and the carrier.

In embodiments of the disclosure, the mapping relationship between the logical channel and the resource attribute is a third mapping relationship, the receiving unit is further configured to acquire a transmission resource, and the device further includes: a third determination unit, configured to determine at least one of the following resource attributes corresponding to the transmission resource: the TTI, or the carrier; and a fourth determination unit, configured to determine one or more logical channels associated with the transmission resource based on the resource attribute corresponding to the transmission resource, and the third mapping relationship.

In embodiments of the disclosure, provided is a computer storage medium with computer-executable instructions stored thereon, wherein the computer-executable instructions, when executed by a processor, implement the method for determining a resource for a logical channel above.

In technical solutions of the embodiments of the disclosure, a terminal receives configuration information from a network side, wherein the configuration information is configured with a first mapping relationship between information associated with a data packet and at least one of the following resource attributes: a TTI, or a carrier; the terminal determines a second mapping relationship between a logical channel and the information associated with the data packet, and determines at least one of the following resource attributes corresponding to the logical channel based on the first mapping relationship and the second mapping relationship: the TTI, or the carrier. By means of the technical solutions of embodiments of the disclosure, the TTI and/or the carrier corresponding to the logical channel are effectively determined in a multi-carrier scenario, so that the terminal can simultaneously transmit and receive data on multiple carriers in the field of V2X.

BRIEF DESCRIPTION OF THE DRAWINGS

The drawings described herein are intended for further understanding of the disclosure and constitute part of the disclosure. The exemplary embodiments of the disclosure and the description thereof serve to explain the disclosure, and do not constitute any improper limitation to the disclosure. In the drawings.

DETAILED DESCRIPTION

In order to understand the features and technical content of the embodiments of the disclosure in more detail, the implementation of embodiments of the disclosure will be described in detail below with reference to the accompany drawings. The accompanying drawing are for reference only and are not intended to limit the embodiments of the disclosure.

In order to facilitate understanding of the technical solution of the embodiments of the disclosure, mode 3 and mode 4 are explained below respectively.

Figure 1:
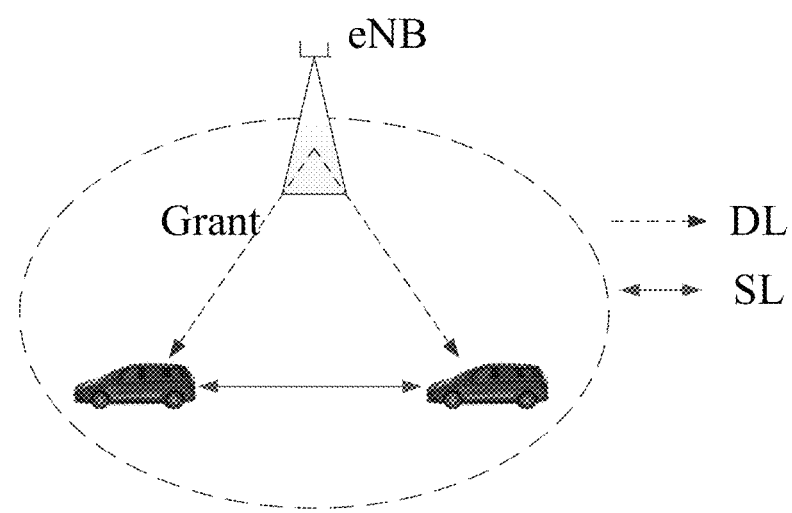
FIG. 1 illustrates a schematic scenario diagram of mode 3 in V2X.

Mode 3: as illustrated in FIG. 1, a transmission resource for a vehicle-mounted terminal is allocated by a base station such as an evolved NodeB (eNB) in LTE. Specifically, the base station issues a control message, for indicating to grant a resource, to the vehicle-mounted terminal through a Down Link (DL); and then, the vehicle-mounted terminal sends data over the SL according to the resource allocated by the base station. In mode 3, the base station may allocate, to the vehicle-mounted terminal, a resource for a single time of transmission, and may also allocate, to the terminal, a resource for semi-static transmission.

Figure 2:
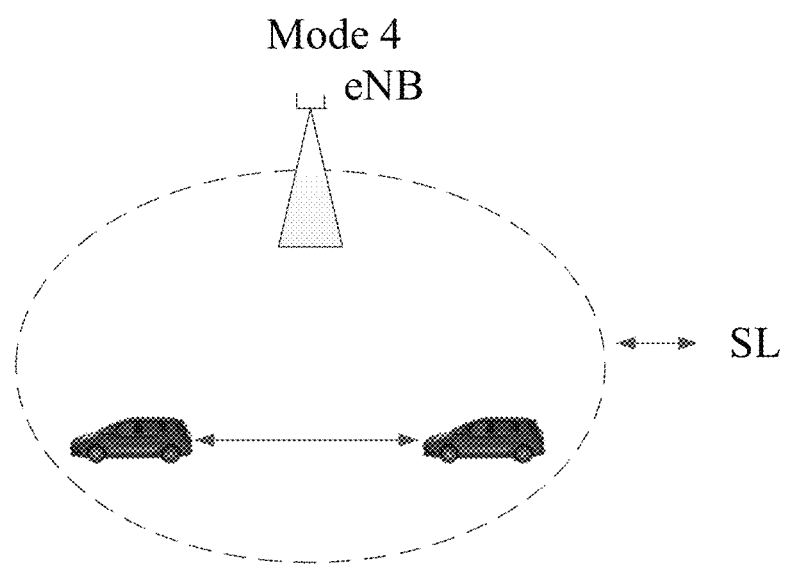
FIG. 2 illustrates a schematic scenario diagram of mode 4 in the V2X.

Mode 4: as illustrated in FIG. 2, a sensing and reservation combined transmission mode is used in the vehicle-mounted terminal. The vehicle-mounted terminal acquires a set of available transmission resources from a resource pool in a sensing mode, and the vehicle-mounted terminal randomly selects a resource from the set of transmission resources, for data transmission. Since services in the V2X system have periodicity, a semi-static transmission mode is usually employed in the vehicle-mounted terminal. That is, after selecting a transmission resource, the vehicle-mounted terminal will continue to use the resource in multiple transmission cycles, thereby reducing the probability of resource reselection and resource conflicts. The vehicle-mounted terminal will carry, in control information in this time of transmission, information of a resource to be reserved for the next time of transmission, so that other terminals can judge, by detecting the control information of the vehicle-mounted terminal, whether the resource has been reserved to be used by the vehicle-mounted terminal, so as to achieve the purpose of reducing resource conflicts.

Figure 3:
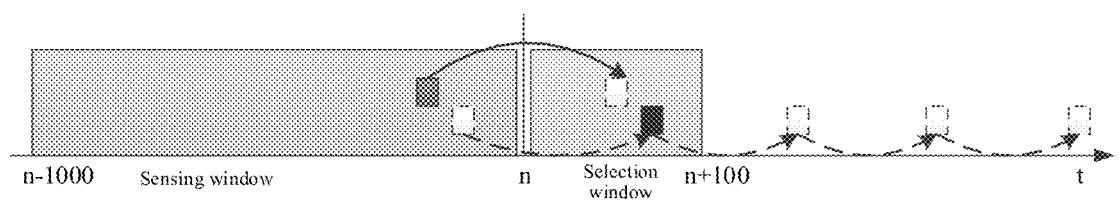
FIG. 3 illustrates a schematic diagram of a terminal sensing and selecting a transmission resource.

FIG. 3 illustrates a schematic diagram of a terminal sensing and selecting a transmission resource. As illustrated in FIG. 3, for each sidelink process, when a new data packet arrives at moment n, a resource needs to be selected. The terminal will select a resource within a selection window of [n+T1, n+T2] milliseconds according to a sensing result in the past 1 second (i.e., a sensing window of [n−1000, n] milliseconds), where T1≤4, and 20≤T2≤100. In this example, a process of the terminal selecting the resource in the selection window is as follows:

The terminal takes all available resources in the selection window as a set A, and the terminal performs the following exclusion operations on the resources in the set A:

1. If the terminal has not detected a result in some subframe within the sensing window, a resource on a subframe, corresponding to the subframe within the sensing window, within the selection window is excluded;

2. If the terminal has detected that a Reference Signal Receiving Power (RSRP) corresponding to a Physical Sidelink Control Channel (PSCCH) is higher than a threshold value in the sensing window, and the next transmission resource reserved in the PSCCH conflicts with data to be transmitted by the present terminal, a user excludes the reserved transmission resource from the set A.

3. The terminal performs a Sidelink Received Signal Strength Indication (S-RSSI) detection on the remaining resources in the set A, sorts the remaining resources according to energy levels, and places 20% (relative to the number of resources in the set A) resources with the lowest energy levels into a set B.

4. The terminal equiprobably selects, from the set B, a resource for data transmission.

When the terminal selects a resource for transmission, the terminal will continue to use and reserve this resource for Cresel times. Each time data is transmitted, Cresel is decremented by 1. When Cresel is decremented to 0, the terminal will randomly generate a random number within [0, 1] and compare the number with the parameter probResourceKeep (abbreviated as P_resKeep). If the random number is greater than P_resKeep, the terminal will reselect a resource. If the random number is less than or equal to P_resKeep, the terminal will continue to use the resource and reset Cresel.

In Rel-14, one carrier is described, namely, a single-carrier scenario. In Rel-15, evolved V2x (eV2x) has been extended to a multi-carrier scenario, that is, a terminal can transmit and receive data on more than one carriers simultaneously. In this way, it is bound to consider how to select a carrier and a TTI for data in a logical channel. For example, considering different properties of Quality of Service (QoS) of services borne by the logical channel, a service of a higher priority needs to be transmitted on a carrier with a higher priority, and a service with a higher requirement on a time delay needs to be transmitted within a shorter TTI.

Based on this, in embodiments of the disclosure, a method for determining a resource for a logical channel is provided.

Figure 4:
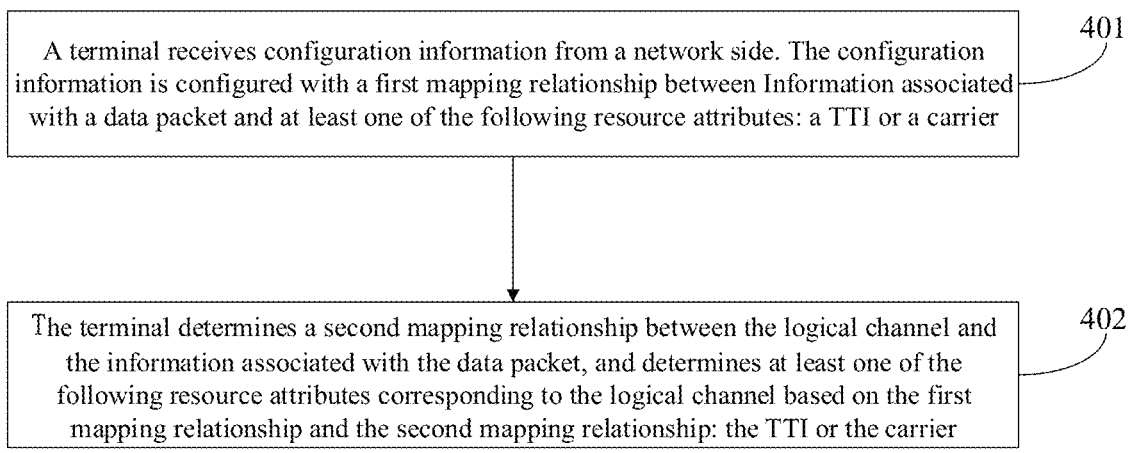
FIG. 4 illustrates a schematic flowchart of a method for determining a resource for a logical channel provided in embodiments of the disclosure.

FIG. 4 illustrates a schematic flowchart of the method for determining a resource for a logical channel provided in embodiments of the disclosure. In this embodiment, the resource for the logical channel refers to a resource serving for the logical channel. As illustrated in FIG. 4, the method for determining a resource for a logical channel includes the following steps:

At step 401: a terminal receives configuration information from a network side. The configuration information is configured with a first mapping relationship between information associated with a data packet and at least one of the following resource attributes: a TTI, or a carrier.

In embodiments of the disclosure, the information associated with the data packet includes one of the following: a PPPP corresponding to the data packet, a destination address corresponding to the data packet, or a PSID corresponding to the data packet.

In embodiments of the disclosure, the first mapping relationship can be implemented in the following three approaches based on different resource attributes:

Approach 1: the first mapping relationship configured in the configuration information includes one of the following: a mapping relationship of the PPPP corresponding to the data packet with the TTI; a mapping relationship of the destination address corresponding to the data packet with the TTI; or a mapping relationship of the PSID corresponding to the data packet of the TTI.

Approach 2: the first mapping relationship configured in the configuration information includes one of the following: a mapping relationship of the PPPP corresponding to the data packet with the carrier; a mapping relationship of the destination address corresponding to the data packet with carrier; or a mapping relationship of the PSID corresponding to the data packet with the carrier.

Approach 3: the first mapping relationship configured in the configuration information includes one of the following: a mapping relationship of the PPPP corresponding to the data packet with the TTI and the carrier; a mapping relationship of the destination address corresponding to the data packet with the TTI and the carrier; or a mapping relationship of the PSID corresponding to the data packet with the TTI and the carrier.

At step 402: the terminal determines a second mapping relationship between the logical channel and the information associated with the data packet, and determines at least one of the following resource attributes corresponding to the logical channel based on the first mapping relationship and the second mapping relationship: the TTI, or the carrier.

In embodiments of the disclosure, the second mapping relationship includes one of the following: a mapping relationship of the logical channel with the PPPP corresponding to the data packet; a mapping relationship of the logical channel with the destination address corresponding to the data packet; or a mapping relationship of the logical channel with the PSID corresponding to the data packet.

In embodiments of the disclosure, under the condition that the first mapping relationship and the second mapping relationship are known, a third mapping relationship, that is, the mapping relationship between the logical channel and the resource attribute, can be determined. Corresponding to the three implementations in step 401, the determination of the resource attribute corresponding to the logical channel also has be implemented in the following three approaches:

Approach 1: based on the first mapping relationship and the second mapping relationship, the following resource attribute corresponding to the logical channel is determined: the TTI.

Approach 2: based on the first mapping relationship and the second mapping relationship, the following resource attribute corresponding to the logical channel is determined: the carrier.

Approach 3: based on the first mapping relationship and the second mapping relationship, the following resource attributes corresponding to the logical channel are determined: the TTI and the carrier.

In addition, the technical solution of embodiments of the disclosure further includes the following steps: the terminal acquires a transmission resource and determines at least one of the following resource attributes corresponding to the transmission resource: the TTI or the carrier; and the terminal determines one or more logical channels associated with the transmission resources based on the resource attribute corresponding to the transmission resource, and the third mapping relationship.

In the above solution, the terminal can acquire the transmission resource from the base station based on Mode 3, or from the resource pool based on Mode 4 by sensing and selecting.

Here, when multiple logical channels associated with the transmission resource are determined, the multiple logical channels may be prioritized, and then the data of the terminal may be transmitted based on the order of priority levels form high to low.

In order to understand the technical solution of embodiments of the disclosure more thoroughly, the technical solution of embodiments of the disclosure will be described in further detail below with specific application examples.

Application Example 1

The first mapping relationship is a mapping relationship of information, associated with a data packet, and a TTI. Here, the information associated with the data packet is a PPPP corresponding to the data packet, a destination address corresponding to the data packet, or a PSID corresponding to the data packet.

Approach 1: referring to table 1 below, the network side can configure, for the terminal, a mapping relationship of the PPPP corresponding to the data packet with the TTI:

TABLE 1

| PPPP 1 | Short TTI |
| PPPP 2 | Long TTI |
| PPPP 3 | Short TTI, Long TTI |

In the table, Short TTI represents a short TTI, Long TTI represents a long TTI, and the length of the long TTI is greater than the length of the short TTI. For the PPPP 1, it corresponds to the Short TTI. For the PPPP 2, it corresponds to the Long TTI. For the PPPP 3, it corresponds to any one of the Short TTI and the Long TTI.

Approach 2: referring to the following table 2, the network side can configure, for the terminal, a mapping relationship of the destination address corresponding to the data packet with the TTI:

TABLE 2

| Destination Address 1 | Short TTI |
| Destination Address 2 | Long TTI |
| Destination Address 3 | Short TTI, Long TTI |

For the Destination Address 1, it corresponds to the Short TTI. For the Destination Address 2, it corresponds to the Long TTI. For the Destination Address 3, it corresponds to any one of the Short TTI and the Long TTI.

Approach 3: referring to the following table 3, the network side can configure, for the terminal, a mapping relationship of the PSID corresponding to the data packet with the TTI:

TABLE 3

| PSID 1 | Short TTI |
| PSID 2 | Long TTI |
| PSID 3 | Short TTI, Long TTI |

For the PSID 1, it corresponds to the Short TTI. For the PSID 2, it corresponds to the Long TTI. For the PSID 3, it corresponds to any one of the Short TTI and the Long TTI.

The terminal determines the TTI corresponding to the logical channel according to the first mapping relationship and the second mapping relationship.

Application Example 2

The first mapping relationship is a mapping relationship of information, associated with a data packet, and a carrier. Here, the information associated with the data packet is a PPPP corresponding to the data packet, a destination address corresponding to the data packet, or a PSID corresponding to the data packet.

Approach 1: referring to table 4 below, the network side can configure, for the terminal, a mapping relationship of the PPPP corresponding to the data packet with the carrier:

TABLE 4

| PPPP 1 | Carrier a |
| PPPP 2 | Carrier b |
| PPPP 3 | Carrier c |

For the PPPP 1, it corresponds to the Carrier a. For the PPPP 2, it corresponds to the Carrier b. For the PPPP 3, it corresponds to the Carrier c.

Approach 2: referring to table 5 below, the network side can configure, for the terminal, a mapping relationship of the destination address corresponding to the data packet with the carrier:

TABLE 5

| Destination Address 1 | Carrier a |
| --- | --- |
| Destination Address 2 | Carrier b |
| Destination Address 3 | Carrier c |

For the Destination Address 1, it corresponds to the Carrier a. For the Destination Address 2, it corresponds to the Carrier b. For the Destination Address 3, it corresponds to the Carrier c.

Approach 3: referring to table 6 below, the network side can configure, for the terminal, a mapping relationship of the PSID corresponding to the data packet with the carrier:

TABLE 6

| PSID 1 | Carrier a |
| --- | --- |
| PSID 2 | Carrier b |
| PSID 3 | Carrier c |

For the PSID 1, it corresponds to the Carrier a. For the PSID 2, it corresponds to the Carrier b. For the PSID 3, it corresponds to the Carrier c.

The terminal determines the carrier corresponding to the logical channel according to the first mapping relationship and the second mapping relationship.

Application Example 3

The first mapping relationship is a mapping relationship of information, associated with a data packet, with a TTI and a carrier. Here, the information associated with the data packet includes: a PPPP corresponding to the data packet, a destination address corresponding to the data packet, or a PSID corresponding to the data packet.

Referring to table 7 below, the network side can configure, for the terminal, a mapping relationship of the PPPP corresponding to the data packet with the TTI and the carrier:

TABLE 7

| PPPP 1 | Short TTI on Carrier a |
| --- | --- |
| PPPP 2 | Long TTI on Carrier b |
| PPPP 3 | Long TTI on Carrier c |

For PPPP 1, it corresponds to the Short TTI on the Carrier a. For PPPP 2, it corresponds to the Long TTI on the Carrier b. For PPPP 3, it corresponds to the Long TTI on the Carrier c.

Those skilled in the art should understand that the technical solution of embodiments of the disclosure is not limited to the corresponding relationship illustrated in Table 7, but may also be a mapping relationship of the destination address with the TTI and the carrier, or a mapping relationship of the PSID with TTI and the Carrier. In addition, for the information associated with a set of data packets, one part of the associated information may correspond to the TTI, another part of the associated information may correspond to the carrier, and even another part of the associated information may correspond to a combination of the TTI and the carrier, thus achieving flexible allocation of resources.

Figure 5:
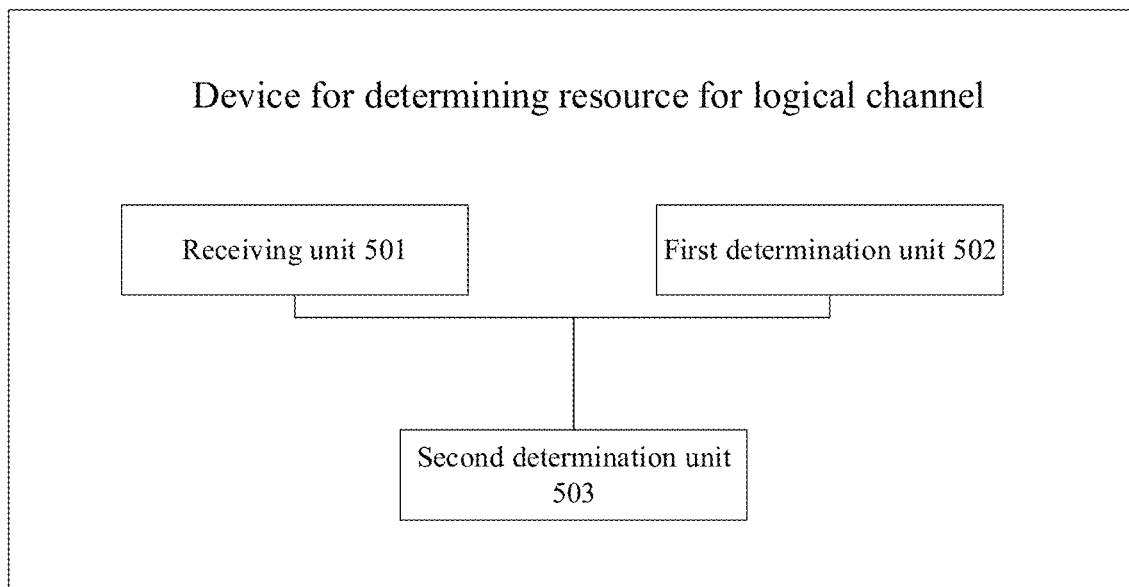
FIG. 5 illustrates a first schematic diagram of structural composition of a device for determining a resource for a logical channel provided in embodiments of the disclosure.

FIG. 5 illustrates a first schematic diagram of structural composition of a device for determining a resource for a logical channel provided in embodiments of the disclosure. As illustrated in FIG. 5, the device for determining a resource for a logical channel includes a receiving unit 501, a first determination unit 502 and a second determination unit 503.

The receiving unit is configured to receive configuration information from a network side. The configuration information is configured with a first mapping relationship between information associated with a data packet and at least one of the following resource attributes: a TTI or a carrier. The first determination unit 502 is configured to determine a second mapping relationship between the logical channel and the information associated with the data packet. The second determination unit is configured to determine at least one of the following resource attributes corresponding to the logical channel based on the first mapping relationship and the second mapping relationship: the TTI or the carrier Those skilled in the art should understand that the functions realized by each unit in the device for determining a resource for a logical channel illustrated in FIG. 5 can be understood with reference to the related description of the preceding method for determining a resource for a logical channel. The function of each unit in the device for determining a resource for a logical channel illustrated in FIG. 5 can be achieved by a program running on a processor or by a specific logical circuit.

Figure 6:
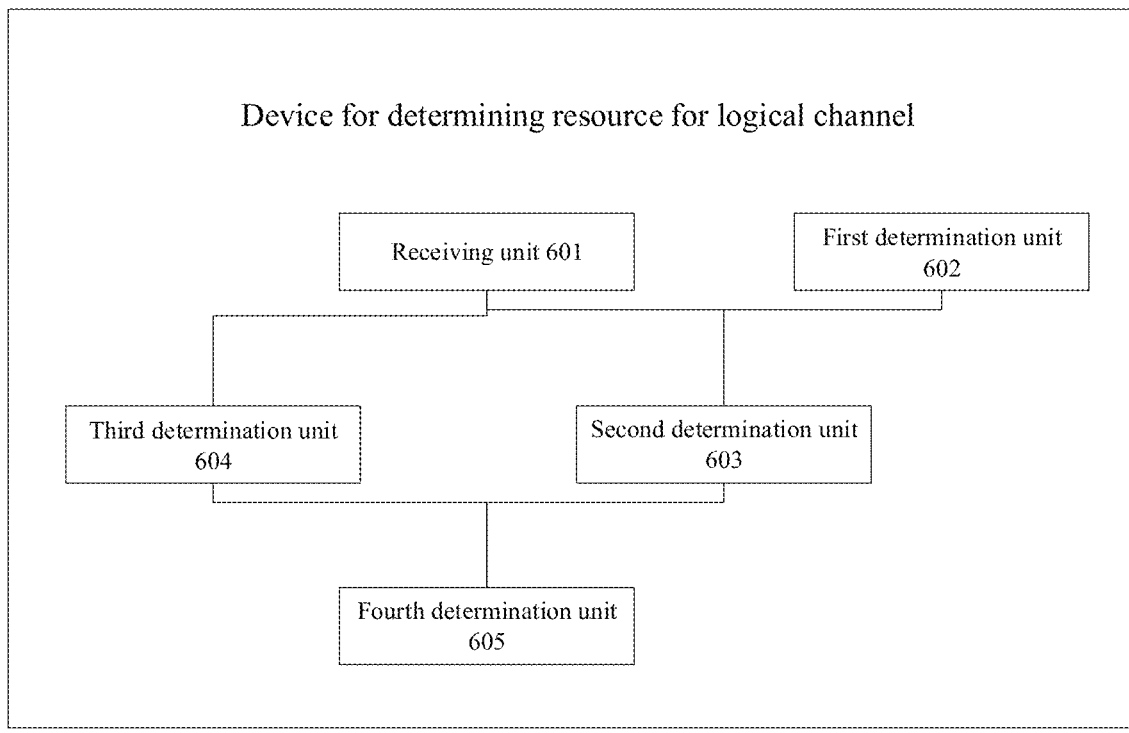
FIG. 6 illustrates a second schematic diagram of the structural composition of the device for determining a resource for a logical channel provided in embodiments of the disclosure.

FIG. 6 illustrates a second schematic diagram of the structural composition of the device for determining a resource for a logical channel provided in embodiments of the disclosure. As illustrated in FIG. 6, the device for determining a resource for a logical channel includes a receiving unit 601, a first determination unit 602 and a second determination unit 603.

The receiving unit is configured to receive configuration information from a network side. The configuration information is configured with a first mapping relationship between information associated with a data packet and at least one of the following resource attributes: a TTI or a carrier. The first determination unit is configured to determine a second mapping relationship between the logical channel and the information associated with the data packet. The second determination unit is configured to determine at least one of the following resource attributes corresponding to the logical channel based on the first mapping relationship and the second mapping relationship: the TTI or the carrier In embodiments of the disclosure, the information associated with the data packet includes: a PPPP corresponding to the data packet, a destination address corresponding to the data packet, or a PSID corresponding to the data packet.

In embodiments of the disclosure, the first mapping relationship configured in the configuration information includes one of the following: a mapping relationship of the PPPP corresponding to the data packet with the TTI; a mapping relationship of the destination address corresponding to the data packet with the TTI; or a mapping relationship of the PSID corresponding to the data packet with the TTI.

In embodiments of the disclosure, the second mapping relationship includes one of the following: a mapping relationship of the logical channel with the PPPP corresponding to the data packet; a mapping relationship of the logical channel with the destination address corresponding to the data packet; or a mapping relationship of the logical channel with the PSID corresponding to the data packet.

In embodiments of the disclosure, the second determination unit 603 is configured to determine the following resource attribute corresponding to the logical channel based on the first mapping relationship and the second mapping relationship: the TTI.

In embodiments of the disclosure, the first mapping relationship configured in the configuration information includes one of the following: a mapping relationship of the PPPP corresponding to the data packet with the carrier; a mapping relationship of the destination address corresponding to the data packet with the carrier; or a mapping relationship of the PSID corresponding to the data packet with the carrier.

In the embodiment of the disclosure, the second determination unit 603 is configured to determine the following resource attribute corresponding to the logical channel based on the first mapping relationship and the second mapping relationship: the carrier.

In embodiments of the disclosure, the first mapping relationship configured in the configuration information includes one of the following: a mapping relationship of the PPPP corresponding to the data packet with the TTI and the carrier; a mapping relationship of the destination address corresponding to the data packet with the TTI and the carrier; or a mapping relationship of the PSID corresponding to the data packet with the TTI and the carrier.

In embodiments of the disclosure, the second determination unit 603 is configured to determine the following resource attributes corresponding to the logical channel based on the first mapping relationship and the second mapping relationship: the TTI and the carrier.

In embodiments of the disclosure, the mapping relationship between the logical channel and the resource attribute is a third mapping relationship. The receiving unit 601 is further configured to acquire a transmission resource. The device further includes a third determination unit 604 and a forth determination unit 605.

The third determination unit is configured to determine at least one of the following resource attributes corresponding to the transmission resource: the TTI or the carrier. The forth determination unit is configured to determine one or more logical channels associated with the transmission resource based on the resource attribute corresponding to the transmission resource, and the third mapping relationship.

Those skilled in the art should understand that the function realized by each unit in the device for determining a resource for a logical channel illustrated in FIG. 6 can be understood with reference to the related description of the method for determining a resource for a logical channel. The function of each unit in the device for determining a resource for a logical channel shown in FIG. 6 can be achieved by a program running on a processor or by a specific logical circuit.

If implemented in the form of a software functional module and is marketed or used as an independent product, the device for determining a resource for the logical channel provided in embodiments of the disclosure can also be stored in a computer-readable storage medium. Based on such understanding, the technical solutions of embodiments of the disclosure in essence or in part that contributes to the related art can be embodied in the form of a software product. The computer software product is stored in a storage medium and includes several instructions for enabling a computer device (which may be a personal computer, a server, or a network device, etc.) to implement all or some of steps of the method described in the embodiments of the disclosure. The mentioned storage medium includes: a U disk, a mobile hard disk drive, a Read Only Memory (ROM), a magnetic disk or an optical disk, and other mediums that can store program codes. Thus, embodiments of the disclosure are not limited to any specific combination of hardware and software.

Accordingly, in embodiments of the disclosure, also provided is a computer storage medium with computer-executable instructions stored thereon, wherein the computer-executable instructions, when executed by a processor, implement the above method for determining a resource for a logical channel provided in embodiments of the disclosure.

Figure 7:
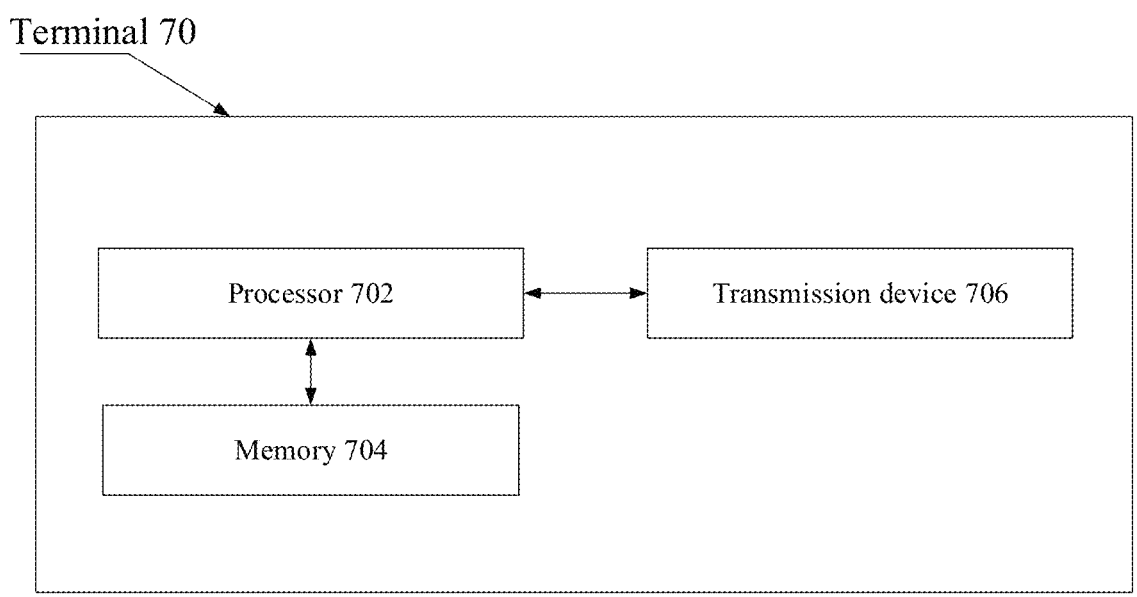
FIG. 7 illustrates a schematic diagram of structural composition of a terminal provided in embodiments of the disclosure.

FIG. 7 illustrates a schematic diagram of structural composition of a terminal provided in embodiments of the disclosure. As illustrated in FIG. 7, the terminal 70 may include one or more (only one is shown in the figure) processors 702 (the processor 702 may include, but not limited to, a processing device such as a Micro Controller Unit (MCU) or a Field Programmable Gate Array (FPGA)), a memory 704 for data storage, and a transmission device 706 for a communication function. Those of ordinary skill in the art can understand that the structure illustrated in FIG. 7 is only schematic and does not limit the structure of the above electronic devices. For example, the terminal 70 may also include more or fewer components than those illustrated in FIG. 7 or have a different configuration from that illustrated in FIG. 7.

The memory 704 can be used to software programs and modules of the storage application software, such as program instructions/modules corresponding to the method for determining a resource for a logical channel provided in embodiments of the disclosure. The processor 702 executes various functional applications and data processing by running software programs and modules stored in the memory 704, i.e., implementing the above method. The memory 704 may include a high-speed random access memory and may also include a non-volatile memory, such as one or more magnetic storage devices, flash memories, or other non-volatile solid-state memories. In some embodiments, the memory 704 may further include memories disposed remote to the processor 702. These remote memories may be connected to the terminal 70 through a network. Examples of the network include, but are not limited to, the Internet, the intranet, a local area network, a mobile communication network, and combinations thereof.

The transmission device 706 is used to receive or transmit data via a network. Particular examples of the network may include a wireless network provided by a communication provider of the terminal 70. In one example, the transmission device 706 includes a Network Interface Controller (NIC), which can be connected to other network devices through a base station so as to communicate with the Internet. In one example, the transmission device 706 can be a Radio Frequency (RF) module, which is used to communicate with the Internet in a wireless mode.

The technical solutions described in embodiments of the disclosure can be combined arbitrarily without conflict.

In several embodiments provided in the disclosure, it should be understood that the disclosed methods and devices can be implemented in other ways. Device embodiments described above are only schematic. For example, the division of units is only a logical function division. In actual implementation, there may be other division methods. For example, multiple units or components may be combined, or may be integrated into another system or, or some features may be ignored or not executed. In addition, the coupling, the direct coupling or the communicative connection between the components shown or discussed may be indirect coupling or communication connection through via some interfaces, devices or units, and may be electrical, mechanical or in other forms.

The units described above as separate parts may or may not to be physically separated. The parts displayed as units may or may not be physical units, i.e., they may be located in one place or distributed over multiple network units.

Some or all of the units can be selected according to actual needs to achieve the purpose of embodiments.

In addition, each functional unit in each embodiment of the disclosure may be integrated into a second processing unit, each unit may be separately used as one unit or, two or more units may be integrated into one unit; the above-mentioned integrated units can be implemented in the form of hardware or in the form of hardware plus software functional units.

The above descriptions are only particular embodiments of the disclosure, but the scope of protection of the disclosure is not limited to this. Changes or substitutions within the technical scope disclosed in the disclosure would easily occur to any one familiar with the technical field, and should fall within the scope of protection of the disclosure.

The invention claimed is:

1. A method for determining a plurality of logical channels for data transceiving, performed by a terminal in a vehicle-to-everything (V2X) system and comprising:
receiving configuration information from a network side, wherein the configuration information is configured with a first mapping relationship between a destination address corresponding to a data packet and at least one of following resource attributes: a transmission time interval (TTI), or a carrier, wherein the carrier is one of a plurality of carriers for the terminal;
determining a second mapping relationship between a logical channel and the destination address corresponding to the data packet; and
selecting at least one of the following resource attributes corresponding to the logical channel based on the first mapping relationship and the second mapping relationship: the TTI, or the carrier, wherein a mapping relationship between the logical channel and the resource attribute is a third mapping relationship; and
acquiring the transmission resource;
determining at least one of the following resource attributes corresponding to the transmission resource: the TTI or the carrier; and
determining a plurality of logical channels associated with the transmission resource based on the resource attribute corresponding to the transmission resource, and the third mapping relationship.

2. The method for determining the plurality of logical channels for data transceiving according to claim 1, wherein the first mapping relationship configured in the configuration information comprises:
a mapping relationship of the destination address corresponding to the data packet with the TTI.

3. The method for determining the plurality of logical channels for data transceiving according to claim 1, wherein the second mapping relationship comprises:
a mapping relationship of the logical channel with the destination address corresponding to the data packet.

4. The method for determining the plurality of logical channels for data transceiving according to claim 3, wherein the following resource attributes corresponding to the logical channel are determined based on the first mapping relationship and the second mapping relationship: the TTI and the carrier.

5. The method for determining the plurality of logical channels for data transceiving according to claim 1, wherein the first mapping relationship configured in the configuration information comprises:
a mapping relationship of the destination address corresponding to the data packet with the carrier.

6. The method for determining the plurality of logical channels for data transceiving according to claim 1, wherein the first mapping relationship configured in the configuration information comprises:
a mapping relationship of the destination address corresponding to the data packet with the TTI and the carrier.

7. A terminal, applied in a vehicle-to-everything (V2X) system and comprising:
a transmission device, configured to receive configuration information from a network side, wherein the configuration information is configured with a first mapping relationship between a destination address corresponding to a data packet and at least one of following resource attributes: a TTI and a carrier, wherein the carrier is one of a plurality of carriers for the terminal; and
a processor, configured to determine a second mapping relationship between a logical channel and the destination address corresponding to the data packet, and
select at least one of the following resource attributes corresponding to the logical channel based on the first mapping relationship and the second mapping relationship: the TTI and the carrier;
wherein a mapping relationship between the logical channel and the resource attribute is a third mapping relationship, the transmission device is further configured to acquire a transmission resource, and
the processor is further configured to determine at least one of the following resource attributes corresponding to the transmission resource: the TTI or the carrier, and
determine a plurality of logical channels associated with the transmission resource based on the resource attribute corresponding to the transmission resource, and the third mapping relationship.

8. The terminal according to claim 7, wherein the first mapping relationship configured in the configuration information comprises:
a mapping relationship of the destination address corresponding to the data packet with the TTI.

9. The terminal according to claim 7, wherein the second mapping relationship comprises:
a mapping relationship of the logical channel with the destination address corresponding to the data packet.

10. The terminal according to claim 9, wherein the processor is configured to determine the following resource attributes corresponding to the logical channel based on the first mapping relationship and the second mapping relationship: the TTI and the carrier.

11. The terminal according to claim 7, wherein the first mapping relationship configured in the configuration information comprises:
a mapping relationship of the destination address corresponding to the data packet with the carrier.

12. The terminal according to claim 7, wherein the first mapping relationship configured in the configuration information comprises:
a mapping relationship of the destination address corresponding to the data packet with the TTI and the carrier.

* * * * *